United States Patent
Yano et al.

(10) Patent No.: US 7,148,946 B2
(45) Date of Patent: Dec. 12, 2006

(54) OPTICAL DEVICE AND LIQUID-CRYSTAL DISPLAY APPARATUS

(75) Inventors: Shuuji Yano, Osaka (JP); Yuuichi Nishikouji, Osaka (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/011,480

(22) Filed: Dec. 11, 2001

(65) Prior Publication Data

US 2002/0071070 A1 Jun. 13, 2002

(30) Foreign Application Priority Data

Dec. 11, 2000 (JP) .......................... P2000-376164

(51) Int. Cl.
  *G02F 1/13* (2006.01)
  *G02F 1/1335* (2006.01)
(52) U.S. Cl. ........................................ 349/175; 349/98
(58) Field of Classification Search .................. 349/35, 349/98, 115, 175
See application file for complete search history.

(56) References Cited

U.S. PATENT DOCUMENTS 5,016,985 A * 5/1991 Kalmanash et al. .......... 349/13
5,196,953 A * 3/1993 Yeh et al. .................... 349/119
6,061,108 A * 5/2000 Anderson et al. ............. 349/98
6,330,108 B1 * 12/2001 Nishikouji et al. .......... 359/499
6,342,934 B1 * 1/2002 Kameyama et al. .......... 349/98
6,377,321 B1 * 4/2002 Khan et al. ................... 349/35
6,421,107 B1 * 7/2002 Greenfield et al. ......... 349/115
2002/0063819 A1 * 5/2002 Yano et al .................... 349/96

FOREIGN PATENT DOCUMENTS

| JP | 62-210423 | 9/1987 |
| JP | 3-67219 | 3/1991 |
| TW | 356530 | 4/1999 |

* cited by examiner

*Primary Examiner*—Toan Ton
(74) *Attorney, Agent, or Firm*—Sughrue Mion, PLLC

(57) ABSTRACT

An optical device including a laminate of cholesteric liquid-crystal layers in which the wavelength ranges of selective reflection of circularly polarized light beams are out of visible light region and which are combined so that circularly polarized light beams transmitted through the cholesteric liquid-crystal layers to be left-handed and right-handed are inverted to each other. A liquid-crystal display apparatus including a vertically aligned liquid-crystal cell, polarizers disposed on opposite surfaces of the liquid-crystal cell, and one or two optical devices defined above and interposed between the liquid-crystal cell and either or each of the polarizers.

4 Claims, 1 Drawing Sheet

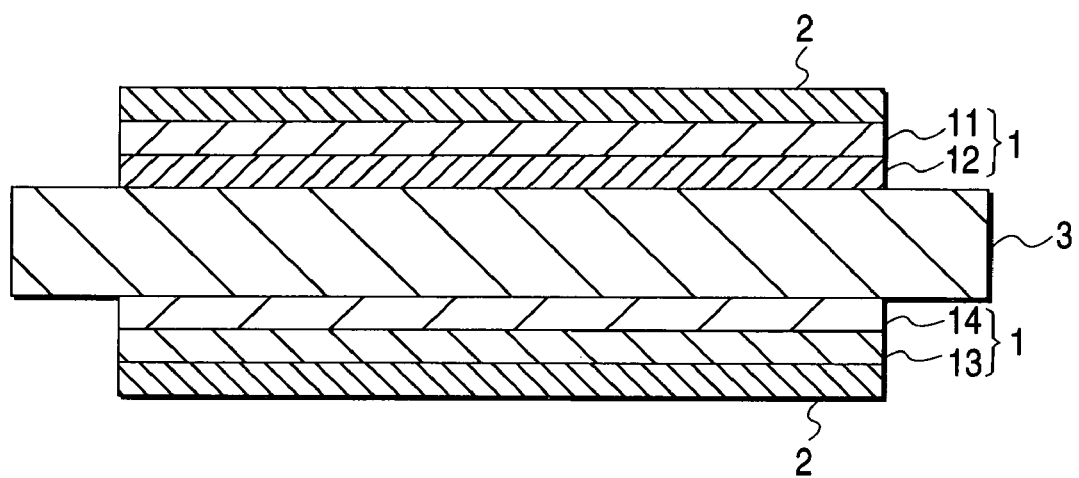

US 7,148,946 B2

OPTICAL DEVICE AND LIQUID-CRYSTAL DISPLAY APPARATUS

The present application is based on Japanese Patent Application No. 2000-376164, which is incorporated herein by reference.

BACKGROUND OF THE INVENTION

1. Field of the Invention

The present invention relates to an optical device in which optical rotatory dispersion hardly occurs so that the optical device can be used for forming a vertically aligned liquid-crystal display apparatus wide in viewing angle and excellent in display quality.

2. Description of the Related Art

In a TN type liquid-crystal cell containing liquid-crystal molecules aligned in a direction horizontal to cell substrates with positive dielectric anisotropy, there was a tendency that the quality of black display was deteriorated by light leakage owing to birefringence of liquid-crystal molecules near to the cell substrates. Heretofore, in consideration of the tendency, there was known a liquid-crystal display apparatus including a vertically aligned (VA) liquid-crystal cell containing liquid-crystal cell molecules aligned substantially vertically to cell substrates with positive or negative dielectric anisotropy, polarizers disposed on opposite surfaces of the liquid-crystal cell, and one or two phase retarders exhibiting index anisotropy of nx=ny>nz and interposed between the liquid-crystal cell and either or each of the polarizers. An optical device made of cholestric liquid crystal has been proposed as the phase retarder (Unexamined Japanese Patent Publications No. Sho. 62-210423 and No. Hei. 3-67219).

The phase retarder is provided for compensating for birefringence produced in an oblique viewing azimuth displaced from a frontal direction to prevent light leakage to thereby obtain good black display even in such an oblique viewing direction. That is, the VA liquid-crystal cell transmits light on the basis of substantially vertical alignment of liquid-crystal molecules of the liquid-crystal cell almost without any change of the plane of polarization. Hence, arrangement of the polarizers in the form of crossed-Nicol on opposite surfaces of the cell can achieve light blockade in a frontal direction perpendicular to the liquid-crystal cell when the liquid-crystal cell is inactive, that is, when the liquid-crystal cell is not supplied with any external voltage. Hence, there is a tendency that good black display is formed in the frontal direction but birefringence occurs in an oblique viewing direction. The phase retarder is provided for compensating for such birefringence. In the background-art cholesteric liquid-crystal type phase retarder, there was however a problem that display quality is deteriorated because of variations in the compensating effect.

SUMMARY OF THE INVENTION

Upon eager investigation to overcome the problem of deterioration of display quality, the present inventors have found that variations in the compensating effect are caused by the cholesteric liquid-crystal type phase retarder. That is, the inventors have found that the compensating state of the phase retarder is made uneven as follows. Optical rotatory dispersion occurs in the phase retarder so that the angle of optical rotation varies in accordance with the wavelength on the basis of the helical pitch of Grandjean-aligned cholesteric liquid crystal. The optical rotatory dispersion interacts with refractive-index wavelength dispersion caused by variations in refractive index of the liquid-crystal molecules of the liquid-crystal cell in accordance with the wavelength, so that it appears as retardation wavelength dispersion caused by variations in retardations owing to the phase retarder in accordance with the wavelength. Accordingly, the retardation wavelength dispersion causes variations in the compensating effect to thereby make the compensating effect uneven.

Therefore, an object of the present invention is to provide an optical device having a compensating effect hardly varying because optical rotatory dispersion hardly occurs in the optical device and, accordingly, to provide a vertically aligned liquid-crystal display apparatus wide in viewing angle and excellent in display quality because of suppression of light leakage not only in a frontal direction but also in an oblique viewing direction displaced from the frontal direction.

According to an aspect of the present invention, there is provided an optical device including a laminate of cholesteric liquid-crystal layers in which the wavelength ranges of selective reflection of circularly polarized light beams are out of visible light region and which are combined so that circularly polarized light beams transmitted through the cholesteric liquid-crystal layers to be left-handed and right-handed are inverted to each other.

According to another aspect of the present invention, there is provided a liquid-crystal display apparatus including a vertically aligned liquid-crystal cell, polarizers disposed on opposite surfaces of the liquid-crystal cell, and one or two optical devices defined above and interposed between the liquid-crystal cell and either or each of the polarizers.

According to the present invention, there can be obtained an optical device which can transmit light in a visible light region efficiently and in which the transmitted light hardly generates optical rotatory dispersion so that retardation wavelength dispersion hardly occurs. The optical device can be used for forming a vertically aligned liquid-crystal display apparatus which is wide in viewing angle in frontal and oblique directions and excellent in display quality through high-grade compensation for birefringence of the liquid-crystal cell in the oblique viewing direction.

Features and advantages of the invention will be evident from the following detailed description of the preferred embodiments described in conjunction with the attached drawings.

BRIEF DESCRIPTION OF THE DRAWINGS

In the accompanying drawings:

FIG. 1 is a sectional view showing an embodiment of the present invention.

DETAILED DESCRIPTION OF THE PREFERRED EMBODIMENTS

The optical device according to the present invention includes a laminate of cholesteric liquid-crystal layers in which the wavelength ranges of selective reflection of circularly polarized light beams are out of visible light region and which are combined so that circularly polarized light beams transmitted through the cholesteric liquid-crystal layers to be left-handed and right-handed are inverted to each other. An example of the optical device is shown in FIG. 1. In FIG. 1, the reference numeral 1 designates an optical device; 11 and 12, cholesteric liquid-crystal layers combined so that circularly polarized light beams transmitted through the cholesteric liquid-crystal layers to be left-handed and right-handed respectively are inverted to each other; and 13 and 14, cholesteric liquid-crystal layers combined in the same manner as described above. Incidentally, FIG. 1 shows a liquid-crystal display apparatus including two optical devices 1 defined above, polarizers 2, and a vertically aligned liquid-crystal cell 3.

Any suitable Grandjean-aligned layer having a helical structure maybe used as each of the cholesteric liquid-crystal layers without any particular limitation if the wavelength range of selective reflection of circularly polarized light is out of visible light region. That is, the cholesteric liquid-crystal layer exhibits characteristic in which a part of light with wavelengths near the center wavelength n·P of incident light parallel to a helical axis is selectively reflected as one of left-handed circularly polarized light and right-handed circularly polarized light when $\underline{n}$ is the average refractive index of the cholesteric liquid-crystal layer, and P is the helical pitch of the cholesteric liquid-crystal layer. If the wavelength range of selective reflection of circularly polarized light appears in the visible light region, the intensity of transmitted light allowed to be used for display is reduced unfavorably. Therefore, a layer in which the wavelength range of selective reflection is out of visible light region is used as the cholesteric liquid-crystal layer so that light in the visible light region can be transmitted efficiently. It is preferable that the transmitted light is in the whole visible light region.

The cholesteric liquid-crystal layer may be formed as a superposed layer made of two cholesteric liquid-crystal layers or three or more cholestric liquid-crystal layers different in the helical pitch of Grandjean alignment and, accordingly, different in the wavelength range of selective reflection. It is preferable from the point of view of reduction in thickness of the optical device that the cholesteric liquid-crystal layer is formed as a single layer. Incidentally, the superposition has an effect in enlarging the wavelength range of selective reflection. Further, the cholesteric liquid-crystal layer may be provided in the form of a cell containing low-molecular liquid crystal put between a pair of substrates but it is preferable from the point of view of handling property, reduction in thickness and the like that a cholesteric liquid-crystal layer is provided in the form of a film or sheet. Accordingly, the optical device may be formed only from such a cholesteric liquid-crystal layer or may be formed from cholesteric liquid-crystal layers held by a suitable supporting member or members.

For example, the film-like cholesteric liquid-crystal layer may be obtained as a film of liquid-crystal polymer, or as a film obtained by attaching a solidified layer of liquid-crystal polymer or a hardened layer of low-molecular liquid crystal onto a transparent substrate. For formation of such a cholesteric liquid-crystal layer, for example, a cholesteric liquid-crystal polymer, a chiral agent-containing nematic liquid-crystal polymer, a chemical compound capable of forming such a liquid-crystal polymer by polymerization by use of light, heat or the like, etc. may be preferably used. Incidentally, a suitable aligning method such as a method using an alignment film subjected to a rubbing treatment or the like, or an aligning method using application of electric field, magnetic field or the like may be applied to Grandjean alignment of cholesteric liquid crystal.

As the transparent substrate for supporting the cholesteric liquid-crystal layer, any suitable substrate may be used without any particular limitation. Generally, a transparent substrate of a polymer may be used. Examples of the polymer include: cellulose-based polymer such as diacetic cellulose or triacetic cellulose (TAC); ester-based polymer such as polyethylene terephthalate or polyethylene naphthalate; carbonate-based polymer; acrylic-based polymer such as polymethyl methacrylate; styrene-based polymer such as polystyrene or acrylonitrile-styrene copolymer; olefin-based polymer such as polyethylene, polypropylene, polyolefin having a cyclo or norbornene structure or ethylene-propylene copolymer; vinyl chloride-based polymer; and amide-based polymer such as Nylon or aromatic polyamide.

Examples of the polymer which can be used for forming the transparent substrate further include: imide-based polymer; sulfone-based polymer; ether-sulfone-based polymer; ether-ether-ketone-based polymer; phenylene sulfide-based polymer; vinyl alcohol-based polymer; vinylidene chloride-based polymer; vinyl butyral-based polymer; allylate-based polymer; oxymethylene-based polymer; epoxy-based polymer; ablend of the polymers; and curable polymer such as polyester-based polymer, acrylic-based polymer, urethane-based polymer, amide-based polymer, silicone-based polymer or epoxy-based polymer curable by heat, ultraviolet-ray irradiation or the like.

Preferably, a film excellent in isotropy such as a cellulose-based film, that is, a film in which the retardation owing to birefringence is as small as possible, is generally used as the transparent substrate. A birefringent film may be used as the transparent film for the purpose of adjustment of the retardation or the like as occasion demands. The birefringent film can be formed as a film oriented by a suitable orienting method such as uniaxial orientation or biaxial orientation. The birefringent film may be bonded to a heat-shrinkable film so that the refractive index in the direction of the thickness of the film is controlled by a method of giving contracting or/and expanding force.

The formation of the optical device can be performed by laminating cholesteric liquid-crystal layers in which the wavelength ranges of selective reflection of circularly polarized light beams are out of visible light region and which are combined so that circularly polarized light beams transmitted through the cholesteric liquid-crystal layers to be left handed and right handed are inverted to each other. Such inversion relation can be formed by a combination of cholesteric liquid-crystal layers in which one cholesteric liquid-crystal layer having a right helical direction and the other cholesteric liquid-crystal layer having a left helical direction is reverse in helical direction due to Grandjean alignment. In this case, it is preferable from the point of view of highly suppressing optical rotatory dispersion that the difference between the wavelength ranges of selective reflection of circularly polarized light beams in the cholesteric liquid-crystal layers laminated in the thus formed combination is as small as possible, and that the difference is especially not larger than 20%, further especially not larger than 10%, particularly especially not larger than 5%.

In the description, any suitable method such as a method of bonding members of the cholesteric liquid-crystal layers to each other by a tackiness agent, an adhesive agent or the like can be used for laminating the cholestric liquid-crystal layers. It is preferable from the point of view of handling property or the like that the optical device is thin and flexible. From this point of view, there may be preferably used a method in which cholesteric liquid-crystal layers are directly superposed and laminated without interposition of any adhesive agent layer or the like by a recoating method, a fusing method using a material separately formed, or the like, or a method in which cholesteric liquid-crystal layers combined so that circularly polarized light beams transmitted through the cholesteric liquid-crystal layers to be left-handed and right-handed are inverted to each other are provided separately on front and rear surfaces of a transparent substrate. The laminating order of the cholesteric liquid-crystal layers is desirable with respect to the relation of lamination in which circularly polarized light beams transmitted through the cholesteric liquid-crystal layers to be left-handed and right-handed are inverted to each other.

As the recoating method or the like, there can be used any suitable method. Examples of the suitable method include: a coating method such as gravure coating, die coating, dip coating or brush coating; and a method of transferring a coating solution layer provided on a separately provided film or transferring a coating film. Incidentally, when a superposed layer of cholesteric liquid-crystal layers is formed on one surface of a transparent substrate having a thickness of from 10 to 300 μm, especially from 20 to 200 μm, further especially from 30 to 100 μm so that the superposed layer has a thickness of from 0.5 to 30 μm, especially from 1 to 20 μm, further especially from 2 to 10 μm, a thin optical device which can be preferably used also as a transparent protective layer for a polarizer, or the like, can be formed. In this case, it is preferable that the optical device is formed as a superposed structure of two cholesteric liquid-crystal layers which are combined so that circularly polarized light beams transmitted through two cholesteric liquid-crystal layers to be left-handed and right-handed respectively are inverted to each other.

The optical device according to the present invention hardly produces optical rotatory dispersion. Hence, the optical device can be preferably used for the suitable purpose of forming a liquid-crystal display apparatus, particularly for optical compensation for a vertically aligned liquid-crystal cell, or the like. As shown in FIG. 1, the liquid-crystal display apparatus can be formed by arranging polarizers 2 in the form of crossed-Nicol on opposite surfaces of a vertically aligned liquid-crystal cell 3 and by arranging one or two optical devices 1 between the liquid-crystal cell 3 and either or each of the polarizers 2. Although FIG. 1 shows the case where the optical devices 1 are disposed on opposite surfaces of the vertically aligned liquid-crystal cell 3, the present invention may be applied also to the case where the liquid-crystal display apparatus including only one optical device is formed.

Each of the optical devices preferably used in the description is an optical device exhibiting index anisotropy of $nx \approx ny > nz$ in which nz is a refractive index in a direction of a Z axis indicating a direction of the thickness of the optical device, nx is a refractive index in a direction of an X axis indicating one direction in a plane perpendicular to the Z axis, and ny is a refractive index in a direction of a Y axis indicating a direction perpendicular to the Z and X axes. The definitions for nx, ny and nz apply hereunder. When optical devices exhibiting such index anisotropy are used, the retardation owing to birefringence of the vertically aligned liquid-crystal cell viewed obliquely can be highly compensated to suppress light leakage from the polarizers arranged in the form of crossed-Nicol to thereby achieve high-grade light blockade.

Incidentally, $nx \approx ny$ means that the retardation obtained by a product of $|nx-ny|$ and the thickness of the optical device is allowed to vary in a range of not larger than 10 nm. Accordingly, $nx \approx ny$ includes $nx = ny$. The index anisotropy of $nx \approx ny > nz$ exhibited by the optical device means that nz is smaller than nx and smaller than ny. The refractive-index difference is not particularly limited but can be determined suitably in accordance with birefringence characteristic, or the like, of the vertically aligned liquid-crystal cell to be compensated.

The optical devices preferred from the point of view of achieving a wide viewing angle through higher-grade compensation are optical devices in which the sum of the absolute values of the thicknesswise retardations of the optical devices is in a range of from 0.5 to 1.3 times, especially in a range of from 0.7 to 1.0 time as large as the absolute value of the thicknesswise retardation of the liquid-crystal cell. The thicknesswise retardation is defined by a product of $\{(nx+ny)/2-nz\}$ and the layer thickness. Accordingly, the thicknesswise retardation of each optical device is calculated by the expression: $\{(nx+ny)/2-nz\} \times d$ in which $d$ is the thickness of the optical device. Incidentally, when only one optical device is disposed on one surface of the liquid-crystal cell, the sum of the absolute values of the thicknesswise retardation of the optical devices means the absolute value of the thicknesswise retardation of the optical device. When two optical devices are disposed on opposite surfaces of the liquid-crystal cell, the sum means the sum of the absolute values of the thicknesswise retardations of the all optical devices.

Any suitable material maybe used as each of the polarizers if the material can transmit linearly polarized light with a predetermined axis of polarization but can absorb the other light components. The material is not particularly limited in kind. Generally, a polarizing film, a polarizing film having one or both surfaces protected by one or two transparent protective films, or the like, may be used as the material. An example of the polarizing film is a polarizing film obtained by orienting/aligning a film of a hydrophilic polymer such as polyvinyl alcohol, partially formalized polyvinyl alcohol or partially saponified ethylene-vinyl acetate copolymer while making the hydrophilic polymer film adsorb a dichromatic substance containing iodine and/or dichromatic dye such as azo-based dye, anthraquinone-based dye or tetrazine-based dye.

The transparent protective layer which is provided on either or each surface of the polarizing film as occasion demands can be formed out of any one of polymers exemplified in the description of the transparent substrate. Especially, a transparent protective layer formed from a polymer and excellent in transparency, mechanical strength, heat stability, moisture sealability, etc. is preferably used. The transparent protective layer maybe formed in an optical device. When such optical devices are integrated with the polarizers, reduction in thickness of the polarizers or the liquid-crystal display apparatus can be attained and the process of assembling the liquid-crystal display apparatus or the like can be simplified. The transparent protective layer can be formed by a suitable method such as a method of applying a polymer solution or a method of bonding and laminating films.

The transparent protective layer may contain fine particles for the purposes of light diffusion, surface roughening, etc. Further, the polarizer maybe formed to have a protective layer on either or each of its opposite surfaces for various purposes of water resistance, etc. in accordance with the transparent protective layer or have suitable functional layers such as an anti-reflection layer or/and an anti-glare layer for the purposes of prevention of surface reflection, etc. The anti-reflection layer can be formed suitably as a light coherent film such as a coat layer of a fluorine polymer or a multilayer metal vapor deposited film. The anti-glare layer can be formed as a resin-coating layer containing fine particles or can be also formed by a suitable method in which a fine irregularity structure is given to a surface by a suitable method such as embossing, sandblasting or etching to thereby diffuse surface-reflected light.

Examples of the fine particles are inorganic particles and organic particles with a mean particle size of from 0.5 to 20 µm. The inorganic particles are made of silica, calcium oxide, alumina, titania, zirconia, tin oxide, indium oxide, ;cadmium oxide, antimony oxide, etc. and may be electrically conductive. The organic particles are made of suitable crosslinked or non-crosslinked polymers such as polymethyl methacrylate and polyurethane. One member or a combination of two or more members suitably selected from the inorganic particles and the organic particles may be used as the fine particles.

In the description, the optical devices, the polarizers and the liquid-crystal cell may be separated from one another. From the point of view of preventing the optical axis from being displaced, preventing foreign matter such as dust from entering the respective parts, or the like, it is preferable that the optical devices, the polarizers and the liquid-crystal cell are fixed to one another. For the fixation/lamination, there can be used a suitable method such as a bonding method using a transparent adhesive layer. The adhesive agent used in the method is not particular limited. From the point of view of preventing the respective optical characteristics of the constituent members from changing, or the like, an adhesive agent not requiring any high-temperature process at the time of curing/drying in the bonding process is preferred and an adhesive agent not requiring any long-time curing process or long drying time is preferred. From this point of view, a hydrophilic polymer-based adhesive agent or tacky layer may, be used preferably.

Incidentally, for forming the tacky layer, it is possible to use a transparent tackiness agent formed from a suitable polymer such as acrylic-based polymer, silicone-based polymer, polyester, polyurethane, polyether, or synthetic rubber. Especially, an acrylic-based tackiness agent is preferred from the point of view of optical transparency, tackiness, weather resistance, and so on. Incidentally, the tacky layer may be provided on either or each of opposite surfaces of the optical device, the polarizer, or the like, for the purpose of bonding a liquid-crystal cell or the like onto a subject of bonding. In this case, a separator or the like may be preferably temporarily attached to the tacky layer until the surface of the adhesive layer is exposed and put into practical use so that the surface of the tacky layer can be prevented from being contaminated.

In the present invention, the liquid-crystal display apparatus can be formed in accordance with the prior art without any particular limitation except that polarizers are disposed in the form of crossed-Nicol on opposite surfaces of a vertically aligned liquid-crystal cell so as to function as the relation between polarizer and analyzer and so that the optical device is disposed between the liquid-crystal cell and at least one of the polarizers. Hence, the method of driving the liquid-crystal cell, or the like, is not particularly limited. For the formation of the liquid-crystal display apparatus, suitable optical devices such as a phase retarder, a light-diffusing plate, a backlight, a light-condensing sheet, or a reflection plate may be disposed suitably as occasion demands.

Example 1

A rubbing-aligned film of polyvinyl alcohol was formed on one surface of a 40 µm-thick TAC film. Cholesteric liquid crystal (CB-15, made by Dainippon Ink and Chemicals, Inc.) was applied on the polyvinyl alcohol film and dried to thereby form a 3 µm-thick coating film 1. Then, a material obtained by adding a chiral agent to liquid crystal of the same kind to make the helical direction reverse to that of the coating film 1 was applied on the coating film 1 and dried to thereby form a 3 µm-thick coating film 2. Thus, an optical device exhibiting index anisotropy of $nx \approx ny > nz$ was obtained. Incidentally, the cholesteric liquid-crystal layers laminated in combination so that circularly polarized light beams transmitted through the cholesteric liquid-crystal layers to be left-handed and right-handed respectively were inverted to each other were provided so that the wavelength ranges of selective reflection of the circularly polarized light beams were both out of visible light region.

Then, in a liquid-crystal display device having polarizers on opposite surfaces of a vertically aligned liquid-crystal cell, the optical device was disposed between the cell and one of the polarizers to thereby form a liquid-crystal display apparatus. In this case, the absolute value of the thicknesswise retardation of the optical device was 0.8 time as large as the absolute value of the thicknesswise retardation of the liquid-crystal cell. Further, color change was measured in the condition that the liquid-crystal display apparatus obtained thus was viewed obliquely at an inclination angle of 70 degrees to a normal line at an azimuth displaced by 45 degrees with respect to the optical axis of the polarizers disposed in the form of crossed-Nicol (this condition applied hereunder). As a result, the color change $\Delta xy$ was 0.05. Incidentally, the color change $\Delta xy$ was calculated by the following expression:

$$\Delta xy = \sqrt{\{(x-x0)^2 + (y-y0)^2\}}$$

In which (x0, y0) were chromaticity coordinates in a direction of the normal line and (x, y) were chromaticity coordinates in a predetermined oblique viewing direction when the liquid-crystal display apparatus was in a white display state.

COMPARTIVE EXAMPLE

The thickness of the coating film 1 was changed to 6 µm. An optical device exhibiting index anisotropy of $nx \approx ny > nz$ but without provision of any coating film 2 on the coating film 1 was obtained. A liquid-crystal display apparatus was obtained in the same manner as in Example 1 except that the optical device without any coating film 2 was used. The color change $\Delta xy$ in the predetermined oblique viewing direction was 0.07.

It is apparent from the description that Example 1 can obtain a liquid-crystal display apparatus which is excellent in color reproduction because of elimination of optical rotatory dispersion of cholesteric liquid-crystal layers as well as reduction in light leakage based on birefringence of a vertically aligned liquid-crystal cell viewed obliquely.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. An optical device comprising a laminate of cholesteric liquid-crystal layers in which circularly polarized light having a specific rotative direction is selectively reflected according to wavelength ranges, wherein all wavelength ranges of circularly polarized light beams that are selectively reflected are not in a visible light region, wherein one of said cholesteric liquid-crystal layers transmits left-handed circularly polarized light having a wavelength that is not in a visible light region, and another of said cholesteric liquid-crystal layers transmits right-handed circularly polarized light having a wavelength that is not in a visible light region wherein the optical device exhibits index anisotropy of $nx \approx ny > nz$ in which nz is a refractive index in a direction of a Z axis indicating a direction of a thickness of said optical device, nx is a refractive index in a direction of an X axis indicating one direction in a plane perpendicular to the Z axis, and ny is a refractive index in a direction of a Y axis indicating a direction perpendicular to the Z and X axes.

2. An optical device according to claim 1, wherein said cholesteric liquid-crystal layers are combined so that a difference between the wavelength ranges of selective reflection of said circularly polarized light beams is not larger than 20%.

3. A liquid-crystal display apparatus comprising a vertically aligned liquid-crystal cell, polarizers disposed on opposite surfaces of said liquid-crystal cell, and an optical device defined in claim 1, said optical device being interposed between said liquid-crystal cell and at least one of said polarizers.

4. A liquid-crystal display apparatus according to claim 3, wherein a sum of an absolute value of thicknesswise retardation in said optical device is in a range of from 0.5 to 1.3 times as large as an absolute value of thicknesswise retardation in said liquid-crystal cell when said thicknesswise retardation is calculated by an expression: $\{(nx+ny)/2-nz\} \times d$ in which nz is a refractive index in a direction of a Z axis indicating a direction of a thickness of said optical device, nx is a refractive index in a direction of an X axis indicating one direction in a plane perpendicular to the Z axis, and ny is a refractive index in a direction of a Y axis indicating a direction perpendicular to the Z and X axes, and d is the thickness of said optical device.

* * * * *